United States Patent [19]
Booker

[11] 3,869,393

[45] Mar. 4, 1975

[54] SOLID LUBRICANT ADHESIVE FILM

[75] Inventor: Aylwin Reed Booker, Tarzana, Calif.

[73] Assignee: Everlube Corporation of America, N. Hollywood, Calif.

[22] Filed: Apr. 7, 1972

[21] Appl. No.: 242,137

Related U.S. Application Data
[63] Continuation-in-part of Ser. No. 39,484, May 2, 1970, abandoned.

[52] U.S. Cl.................... 252/12.2, 252/12, 285/94, 285/355
[51] Int. Cl............................................. C10m 7/26
[58] Field of Search .......... 252/12, 12.2, 12.4, 12.6; 285/94, 355

[56] References Cited
UNITED STATES PATENTS

| | | | |
|---|---|---|---|
| 2,400,099 | 5/1946 | Brubaker et al. | 252/12 |
| 3,002,770 | 10/1961 | Chestnut et al. | 252/12 |
| 3,438,896 | 4/1969 | Council et al. | 252/12 |
| 3,455,864 | 7/1969 | Dodson | 252/12 |

Primary Examiner—Daniel E. Wyman
Assistant Examiner—I. Vaughn
Attorney, Agent, or Firm—Harris, Kern, Wallen & Tinsley

[57] ABSTRACT

A solid lubricant adhesive film used in the preparation of sealed, nonseizing threaded joints is composed of an adhesive film, such as the type of adhesive film used in transfer tapes, one side of which has been impregnated with a finely powdered solid lubricant, such as molybdenum disulfide or graphite. The solid lubricant adhesive film is wrapped around the threaded portion of a male fitting of a threaded joint, adhesive side down, and then the threaded portions, male and female, of the joint are screwed together and tightened to form a sealed, nonseizing joint.

3 Claims, 5 Drawing Figures

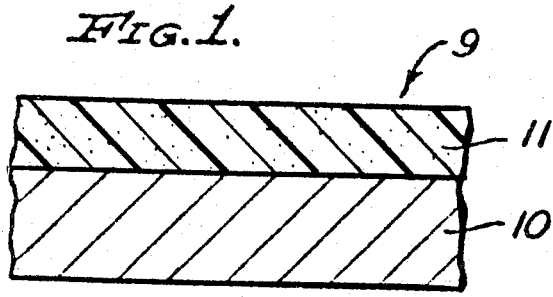
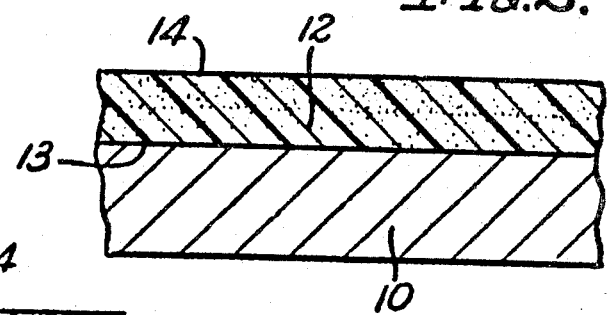
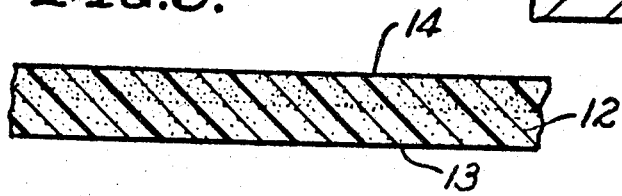
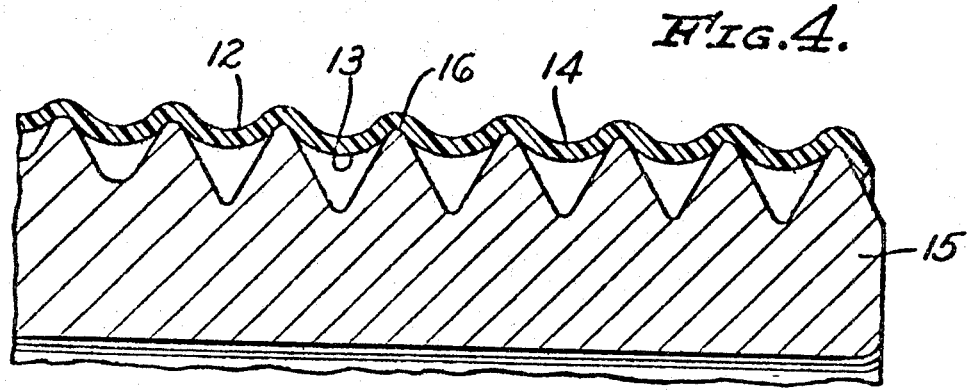
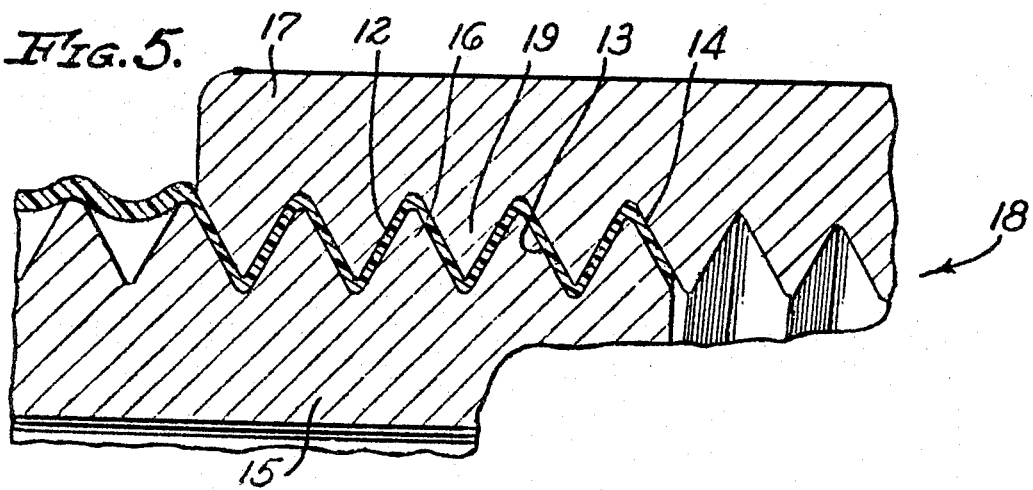

SOLID LUBRICANT ADHESIVE FILM

CROSS-REFERENCE TO RELATED APPLICATION

This application is a continuation-in-part of my co-pending application Ser. No. 39,484, filed May 21, 1970, now abandoned.

Description of the Prior Art

The formation of a sealed, nonseizing threaded joint is a problem which has not been satisfactorily solved to date. It is well known that when an untreated threaded joint is mechanically tightened, the joint will seize over a period of time. Furthermore, it is well known that an untreated or uncoated threaded joint has very poor sealing properties with respect to vacuum applications or high pressure applications.

The seizing of a threaded joint generally arises from the spot welding of the metal-to-metal contact between the threads of the female and male fittings. The welds occur through the transfer and joining of metal molecules of the female fitting with the male fitting and vice versa. The only means of preventing this type of welding, besides employing chemically different metals or metal alloys for each fitting of the joint, is to interpose an inert material between the threads of each portion. This is generally attempted by coating the threads of the joint with grease, oils, nondrying liquid or semisolid polymers, powdered lubricants or strips of polytetrafluoro ethylene. These measures are not always successful because the coating is forced out of the contact areas between the threads when the joint is tightened allowing metal-to-metal contact. Only when dry powdered solid lubricants are used as a thread coating is it possible to prevent metal-to-metal contact between threads. Some of the more common methods that have been used in the past to form a sealed nonseizing threaded joint include the following: coating the threads of the joint fittings prior to assembly with an oil or grease such as linseed oil, olive oil, mineral oil, or water-resistant lubricant grease with or without pigments such as zinc oxide, titanium oxide, or lead oxide, and then screwing the threaded joint together. Threaded joints treated in accordance with this method are initially fairly tight, that is leakproof, if not subjected to high or low temperatures and/or vacuum conditions or high pressures. Further, after a time oil and greases tend to dry out and/or polymerize to form a solid cake of material which strongly adheres to the surfaces of the threads and effectively glues the joint. A further drawback to such oils and greases is the fact that when they begin to dry or polymerize, they crack forming crevices through which gases or liquids can pass causing the joint to leak. A further disadvantage of oils and greases is that they are messy to use and readily soil hands, clothing and the like.

In an attempt to overcome many of the deficiencies in oils and greases for such uses, liquid or semisolid nondrying polymers, such as polyethylene glycol, polypropylene glycol or polyglycerol polymers, silicone liquid or semisolid polymers and the like, either pigmented or unpigmented, have been used in place of the conventional greases and oils. These nondrying polymeric materials have a much longer resilient life than the corresponding oils and greases and thus make a threaded joint sealable for a longer period of time. However, these nondrying polymers offer no advantages over oils and greases in preventing seizing as described above.

In order to prevent seizing of joints, workers in the past have sprayed or brushed the finely powdered graphite or other solid lubricants upon joints prior to threading them together. This method is generally quite successful in preventing seizing. However, it has no effect in making a sealable joint. Attempts have been made to obtain advantages of both the finely powdered solid lubricants and the liquid or semisolid oils or nondrying polymers by combining the finely powdered solid lubricants and oils, greases, or nondrying polymers. These compositions offer no advantages over the oils, greases and non-drying polymers. The solid lubricants do not enhance the sealing properties of the oil, grease, or nondrying polymer. The powdered solid lubricant becomes effectively wetted when dispersed in the oil, grease, or nondrying polymer. When such a composition is applied to threads of a joint, the powdered lubricants do not adhere to or coat the metal surface of the threads as it does in the dry state, but rather it remains in the liquid phase of the composition, that is, the oil, grease or nondrying polymer is forced out with the liquid phase between the areas of thread contact when the joint is tightened.

Another method of forming sealed, nonseized pipe joints involves the use of Teflon brand tape either with or without an adhesive backing (see U.S. Pat. No. 3,002,770). The use of Teflon tape has not been uniformly successful because it has a tendency to shred and ball up when the joint is screwed together, thus permitting the joint to seize and/or leak.

BRIEF DESCRIPTION OF THE INVENTION

The present invention is directed to a solid lubricant adhesive film comprising an adhesive film having an adhesive side and a nonadhesive, lubricating side impregnated with a finely powdered solid lubricant. The film is wrapped around the threads of a male fitting of a threaded joint, adhesive side down, prior to assembly of the joint. When the male and female fittings of the joint have been screwed together and tightened, the adhesive film flows under pressure to form a sealing matrix between the threads of the male portion and female portion of the joint.

An object of the present invention is to provide a leakproof threaded joint. More particularly, an object of the present invention is to provide a means of forming a sealed joint for vacuum conditions, high pressure conditions, low temperature conditions and/or high temperature conditions.

Another object of the present invention is to provide a means of preventing the seizing of a threaded joint. More particularly it is an object of the present invention to provide a sealed threaded joint which will not seize.

A further object of the present invention is to provide a means for fulfilling the above objects with the use of a non-liquid and nonmessy material. More particularly it is an object to provide a material which will seal and prevent the seizing of threaded joints without caking the threads of the fittings with material.

Another and further object of the present invention is to provide an inexpensive and simple method of preparing sealed, nonseizing threaded joints which can be used under a variety of operating conditions.

Description of the Drawing

FIG. 1 is an enlarged sectional view of a layer of an adhesive film supported on a nonadherent backing;

FIG. 2 is an enlarged sectional view of a layer of the solid lubricant adhesive film of the present invention supported on a nonadherent backing;

FIG. 3 is an enlarged sectional view of a layer of the solid lubricant adhesive film of the present invention;

FIG. 4 is an enlarged sectional view of a threaded male fitting of a threaded joint which has been wrapped with the solid lubricant adhesive film of the present invention; and FIG. 5 is an enlarged sectional view of a male-female threaded joint which has the solid lubricant adhesive film of the present invention interposed between the male and female threads.

Description of the Preferred Embodiment of the Present Invention

Referring to FIG. 1 of the drawing, the solid lubricant adhesive film of the present invention is conveniently prepared from a pressure-sensitive adhesive tape 9 which consists of a removable, releasable-type flexible backing 10 upon which is coated a layer of an adhesive film 11. The removable backing 10 has a low adhesion or release-type surface adjacent the adhesive film 11 which carries the film. The removable backing 10 can be made of any material which does not readily adhere to the adhesive film 11, such as a polyethylene film or a paper coated with a silicon or other release agent (see U.S. Pat. No. 2,607,711). The adhesive film can be prepared from a variety of normally tacky, pressure-sensitive, adhesive compositions. The adhesive composition can be prepared from a synthetic rubbery polymer of the class consisting of the polymers of esters of acrylic acid, esters of alpha-methylacrylic acid, esters of vinyl alcohol, ethers of vinyl alcohol; and copolymers of the esters of acrylic acid or the esters of alpha-methylacrylic acid and acrylonitrile, methacrylonitrile, acrylic acid or alphamethylacrylic acid. The synthetic rubbery polymers and copolymers are well known to the art and the means for the preparation are fully described in the following U.S. Pat. Nos.: 2,410,053, 2,548,980, 2,553,816, 2,607,711, 2,941,661, 3,008,850, 3,062,683, and Re-24,906. The adhesive film 11 is coated upon the removable backing 10 by spraying, brushing on, or rolling on. Pressure sensitive adhesive tapes are also available commercially and one such tape which is suitable for use is manufactured by the Minnesota Mining and Manufacturing Company under the designation, Number 465 adhesive transfer tape.

Referring to FIG. 2, the adhesive side 13 of the film 12 is supported upon the removable backing 10. The upper side of the solid lubricant adhesive film 12 is a nonadhesive, lubricating side 14 which is impregnated with a solid lubricant mixture. The solid lubricant mixture contains finely powdered solid lubricants having particle sizes between about 1 micron and about 1,000 microns, preferably between about 10 microns and about 100 microns. Typical finely powdered solid lubricants employed in the present invention include molybdenum disulfide graphite, lead, silver, tin, polytetrafluoro ethylene, and mixtures thereof. The solid lubricant mixture can optionally contain an elastic polymeric component such as rubber, or plastic having a low softening point, such as a softening point of less than 200° C. The polymeric component is compatible with the adhesive composition of the adhesive film 12 and is employed to increase the integrity and tensile strength of the adhesive film.

The rubber component can constitute up to about 50 percent by weight of the solid lubricant mixture, and is preferably 50 percent by weight of said mixture. The rubber component is either a naturally occurring rubber or a synthetic rubber, examples of which are neoprene, styrene rubber, butyl rubber, silicone rubber, thiokol, acrylic rubber, polyester rubber, butadiene styrene rubber, polyisobutylene rubber, vinyl polymer rubber, and the like. The preferred rubber is a liquid neoprene rubber distributed by Roberts Consolidated Industries, Inc., 1600 East Evergreen Avenue, Monrovia, Calif., a subsidiary of United States Plywood Corporation, under the designation, EO 810 A, black neoprene spread, B Number 2815.

The plastic component can constitute by weight up to 91 percent of the solid lubricant mixture, preferably the plastic employed constitutes 50 percent of the mixture with the balance being the finely powdered solid lubricant. Typical plastic materials that can be employed as the polymeric component include polyvinyl alcohol ester resins, polymers of the esters of acrylic acid, polymers of the esters of alpha-methylacrylic acid, polymers of the ethers of vinyl alcohol, copolymers of acrylic acid or alpha-methylacrylic acid and acrylonitrile, alpha-methylacrylonitrile, acrylic acid esters and alpha-methylacrylic acid esters; the preferred plastic is a polyvinyl alcohol ester resin having a softening point between 100°C. and about 170°C. Typical polyvinyl alcohol ester resins which can be employed in the present invention include Bakelite brand vinyl butyral resin XYHL and XYSG produced by the Bakelite Company, a Division of Union Carbide and Carbon Corporation.

Another class of adhesive compositions that can be utilized in the present invention includes rubber latex-rosin compositions. The rubber component can consist of natural rubber, butadiene styrene rubbers, butyl rubber, neoprene, polyisobutylene rubber, vinyl polymer rubber, and the like, in combination with a tacky adhesive resin such as rosin, dehydrogenated rosin, hydrogenated rosin, terpene polymers, hydrogenated coumaroneinde resins, acetylene-p-tert-butylphenol resins, and the like. The resin compositions may also include plasticizers, mineral fillers, antioxidants, and other modifiers known to the art.

A composition of the adhesive film can be varied for various uses without departing from the concept of this invention. For example, silicon adhesive polymers can be used in those cases where the solid lubricant adhesive film is going to be subjected to extreme high or low temperatures. The adhesive composition can also be formulated to be resistant to the action of certain types of chemicals or gases in order to prevent attack of the solid lubricant adhesive film by such chemicals or gases. Since the nonadhesive lubricating side 14 of the film 12 is nonadhesive and nontacky, the film 12 with its removable backing 10 can be conveniently packaged in rolls without a protective coating or film for side 14.

There are various procedures for impregnating the adhesive film 11 with the solid lubricant mixture. One method of impregnating the film 11 consists of applying the solid lubricant mixture to exposed sides of the adhesive film 11 carried on its other adhesive side by a removable backing 10. The mixture can be rolled on, sprayed on, or brushed on, preferably rolled on. When the mixture being applied consists of a solvent and a finely powdered solid lubricant, a solvent is selected that is compatible with the composition of the adhesive film. When the mixture that is being applied consists of not only a finely powdered solid lubricant and solvent but also a polymeric component, a solvent is selected that is mutually compatible with the polymeric component and the adhesive film; preferably the polymeric component is soluble in the solvent. After application of the mixture to the film, the solvent is evaporated off the film either by air-drying or drying the film at elevated temperatures, preferably below 100°C.

Another manner in which the film 11 can be impregnated comprises rolling or spraying the dry powdered solid lubricant mixture onto the film and then rolling the film between calendered rollers to work the finely powdered solid lubricant into the surface of the film. This method is preferably used if a high density of the finely powdered solid lubricant is desired with maximum penetration of the solid lubricant into the adhesive film. The penetration depth is controlled by the amount of powder applied and the number and pressure of the rollers. Generally the material penetrates to depths between about 10 percent and 80 percent of the film, preferably about 50 percent.

Another method of impregnating the adhesive film is to mix finely powdered dry solid lubricant with a finely particulated polymer such as the polyvinyl alcohol ester resins described above. About 3 parts of the solid lubricant are utilized per each part by weight of the polymeric material. The dry mixture of the solid lubricant and polymer are ground in a ball mill until the polymer and solid lubricant are thoroughly intermixed and ground to proper size, such as between about 10 microns and about 100 microns. The dry mixture can then be applied in dry form as described above or dispersed in an organic solvent which is compatible with the adhesive composition of the film and which dissolves the polymer. The liquid mixture is then sprayed, brushed, or rolled onto the adhesive film as described above. The amount of the mixture applied to the adhesive film 11 is controlled to provide the desired penetration depth of between about 10 percent and about 80 percent of the film thickness, preferably about 50 percent of the thickness. After the application of the mixture, the solvent is evaporated off the film by air-drying the film or passing it through ovens heated to elevated temperatures. After the solvent is evaporated off, the film can be readily packaged in roll form. When the film has been impregnated with a powdered mixture of solid lubricant and polymer, the treated film is preferably placed in a flash-heat oven at a temperature sufficiently high to cause the polymer particles to soften in order to form a continuous polymeric lattice in the adhesive to strenghen the film. This procedure gives the adhesive film greater tensile strength and makes it easier to handle in application.

As stated above, the present solid lubricant adhesive film is conveniently packaged in roll form. In application the tape is unrolled from the roll with the removable backing 10 supporting the solid lubricant adhesive film 12. Prior to applying the film 12 to a threaded joint, the removable releasable-type flexible backing 10 is stripped away from the film 12 in the same manner that the removable backing is removed from the adhesive layer of transfer tape. Referring to FIG. 4, the solid lubricant adhesive film 12 is wrapped around the male portion 15 of a threaded fitting 18 with the adhesive side 13 down making contact with the threads 16 and the nonadhesive lubricating side 14 facing upward or outward.

Referring to FIG. 5, the male fitting 15 and the female fitting 17 of threaded joint 18 are then screwed together compressing the solid lubricant adhesive film 12 and causing it to flow and fill the voids between the threads 16 of the male fitting 15 and the threads 19 of the female fitting 17. The adhesive side 13 of the film 12 adheres to the surface of the threads 16 of the male fitting 15, and the nonadhesive lubricating side 14 is pressed against the threads 19 of the female fitting 17 of the threaded joint 18. Once the joint is tightly secured, a sealed nonseizing threaded joint 18 is formed which has the ability to withstand vacuum conditions, high pressure conditions, high temperature conditions, and/or low temperature conditions. The adhesive material creates the seal in the threaded joint and the powdered solid lubricant effectively coats the surface of the threads 19 of the fitting 17 preventing the joint from seizing.

As described above, when solid lubricants are mixed with oils, etc., the solid lubricant particles become wetted with the oil, etc., and lose their ability to adhere to or coat metal surfaces. The composition of the present invention overcomes these difficulties apparently because the powdered dry solid lubricant is not wetted by the adhesive composition but rather is merely dispersed therein to form a mere mechanical mixture. Accordingly, when the film is applied to the threads of a joint, and the joint is tightened, the powdered lubricant can still effectively adhere to or coat the metal surface of the threads which prevents the solid lubricant from being forced out the areas of contact between the threads.

Example 1

A viscous pressure-sensitive adhesive coating composition was prepared by dissolving 100 parts of a tacky copolymer of isooctyl acrylate and acrylic acid (95:5 ratio) 100 parts of a volatile solvent consisting of 80 percent heptane and 20 percent propyl alcohol. This solution was subject to mixing in a commercial reaction kettle equipped with mixing blades. The adhesive composition was coated on a transfer tape liner, a glassine paper having a silicone releasing coating on each side. The resulting coated web was passed through an oven to remove the solvent and dry the pressure-sensitive adhesive coating. The dry coated web was then passed through a roller coating section and coated with a solid lubricant mixture containing 25 parts by weight of a polymeric component having a softening point of between 135° and 140° F. and containing 80 percent of a vinyl butyral resin and 20 percent of a vinyl alcohol resin, 25 parts of molybdenum disulfide powder (particle size 10–100 microns) and 50 parts of a methyl ethyl ketone solvent containing 15 percent ethyl alcohol. The resulting wet solid lubricant adhesive film was passed through another oven to remove the solvent and the resulting dry solid lubricant adhesive film was wound into large jumbo rolls. The large jumbo rolls can later be unwound, slit and rewound into tape rolls of desired size. Alternatively the adhesive composition can be laminated to a polyethylene film, either pigmented or nonpigmented, dried and then coated with a solid lubricant mixture, dried and rolled into rolls to provide a solid lubricant adhesive film carried by flexible polyethylene nonadhesive release-type liner.

Example 2

An isoamyl acrylate monomer (285 grams) in 350 grams of ethyl acetate is copolymerized with acrylic acid (15 grams) in 350 grams of ethyl acetate employing benzoyl peroxide (2 grams) as a catalyst. The solution was held at 65° C. for 5 hours until polymerization was largely complete, then at about 70° C. for one hour to provide a viscous solution containing about 30 percent of nonvolatiles. The mixture was cooled to room temperature and diluted to 20 percent nonvolatiles with heptane. The resulting solution was coated by conventional means on a nonadherent removable liner prepared in accordance with the disclosure of U.S. Pat. No. 2,607,711. The resulting wet coated web passed through an oven drier at 220° F. to dry the pressure-sensitive adhesive layer. The dry coated web having a thickness of 2 mils was then passed over a dry powder sprayer station and sprayed with a dry solid lubricant mixture. The solid lubricant mixture was prepared by mixing equal portions of a powdered vinyl butyral resin with a powdered lubricant mixture consisting of 50 percent molybdenum disulfide, 40 percent powdered graphite, and 10 percent powdered lead. The resulting mixture is placed in a ball mill and ground until the particles of the solid lubricant and polymeric component (resin) are thoroughly mixed and reduced to a particle size of less than 100 microns. After the application of the solid lubricant mixture, the resulting solid lubricant adhesive film is passed through a series of calendering rolls which work the dry powdered solid lubricant mixture about half way into the adhesive film. The solid lubricant adhesive film is then passed through a flash heat oven causing the resin particles to soften and form a continuous resin lattice within the adhesive film. The solid lubricant adhesive film carried on the flexible nonadherent releasable-type line is then rolled into large jumbo rolls and later cut and wound into smaller tape size rolls for marketing.

Solid lubricant adhesive tape of comparable quality can be prepared by employing vinyl acetate resins, vinyl chloride acetate resins or vinyl alcohol acetate resins in place of vinyl butyral resin in the above solid lubricant mixture.

Example 3

A suitable solid lubricant adhesive film can be prepared according to the procedure of Example 1 utilizing the following synthetic rubbery copolymer. A mixture of 104 grams of distilled water, 8 grams of a 25 percent solution of alkylated aryl, polyether sodium sulfonate, 95.5 grams of isooctyl acrylate, 4.5 grams of acrylic acid and 0.08 grams of tertiary dodecyl mercaptan is brought to 30° C. with agitation under a nitrogen gas atmosphere. To the resulting mixture, 200 milligrams of potassium persulfate and 67 milligrams of sodium bisulfide are added; polymerization proceeds rapidly with the evolution of heat. The rubbery, tacky polymer is recovered from the emulsion, dried and dissolved in a mixture of 80 parts of heptane and 20 parts of propyl alcohol to form a rubbery tacky adhesive composition which can be used to prepare adhesive films as described in Examples 1 or 2.

An equally acceptable adhesive composition is prepared in accordance with the above procedure by employing acrylonitrile in place of acrylic acid.

Example 4

An excellent solid lubricant adhesive film can be prepared by the procedure described in Example 1 by utilizing the following synthetic rubber polymer. A polymerization vessel is provided with means for heating and cooling, a stirrer, reflex condenser and thermometer. It is charged with 210 grams of octadecyl acrylate and 14 grams of acrylic acid dissolved in 65 grams of ethyl acetate. The resulting mixture is then charged with 175 milligrams of benzoyl peroxide, the stirrer is actuated in the reaction vessel and the mixture is purged with nitrogen gas. The reaction proceeds rapidly and the temperature is held at 50° C. The reaction is continued until the solid content has reached 25 percent. This requires a little more than four hours after the onset of the polymerization reaction; the temperature is then raised to 70° C. to increase the rate of polymerization. When the solid content reaches about 35 percent, which occurs usually after 2 hours after the solid content has reached 25 percent, the polymerization is considered to be complete. The viscosity of the resulting reaction mixture is quite high and the mixture is conveniently diluted to a 25 percent solid content with toluene for easier handling. Prior to coating the flexible nonadherent release-type backing, the adhesive composition is thinned to about 10 percent solids content with further toluene. Further suitable adhesive compositions that can be utilized in making the adhesive films for solid lubricant adhesive films of the present invention are described in U.S. Pat. Nos. 2,553,816, 2,973,286, and 3,008,850.

Example 5

The procedure of Example 1 was repeated utilizing a solid lubricant mixture dissolved in propyl alcohol consisting of equal parts of molybdenum disulfide and graphite. The resulting solid lubricant adhesive film has less tensile strength but equal sealing and nonseizing properties as the solid lubricant adhesive film prepared in Example 1.

Example 6

An excellent solid lubricant adhesive film is prepared according to the procedure of Example 1 utilizing a solid lubricant mixture dissolved in a 50:50 mixture of heptane and isopropyl alcohol consisting of 9 parts molybdenum disulfide and 91 parts of a vinyl acetate resin (powdered dry Bakelite vinyl resin WC–130). The resulting solid lubricant adhesive film has sealing properties and nonseizing properties similar to the adhesive film prepared in Example 1.

Example 7

An adhesive film was prepared according to the procedure of Example 2, omitting the flash oven treatment, employing a solid lubricant mixture consisting of 100 parts graphite. The resulting solid lubricant adhesive lubricant film has properties substantially equivalent to the properties of the solid lubricant adhesive film of Example 2.

Example 8

A solid lubricant adhesive film is prepared according to the procedure of Example 1 employing the following solid lubricant mixture: 90 parts of a 50:50 mixture of powdered tin and lead, 10 parts of a vinyl acetate resin having a softening point of 120° F. and 100 parts of a 50:50 acetone ethyl alcohol solvent. The resulting solid lubricant adhesive film has properties which are substantially identical to the properties of the solid lubricant adhesive film of Example 1.

Example 9

A solid lubricant adhesive film is prepared according to the procedure of Example 1 employing the following solid lubricant mixture: 75 parts of powdered polytetrafluoro-ethylene having particle sizes of less than 150 microns and 25 parts of an 86:14 vinyl chloride-acetate resin dissolved in 100 parts of a 1:1 mixture of methyl ethyl ketone and toluene.

Example 10

A solid lubricant adhesive film is prepared according to the procedure of Example 1 employing the following solid lubricant mixture: 60 parts of a powdered mixture of solid lubricants consisting of 75 percent molybdenum disulfide, 20 percent lead and 5 percent silver ground to a particle size of less than 75 microns, 40 parts of 20:80 vinyl alcohol-acetate resin and 200 parts of ethyl acetate.

Example 11

A solid lubricant adhesive film can be prepared according to the procedure of Example 2 employing the following solid lubricant mixture: 40 parts of a mixture of powdered solid lubricants consisting of 33⅓ percent graphite, 33⅓ percent lead, and 33⅓ percent tin ground to a particle size of between 10 and 100 microns, and 60 parts of powdered vinyl acetate resin having a softening point of about 150° F.

Example 12

A solit lubricant adhesive film was prepared by preparing a mixture of 50 percent by weight of molybdenum disulfide powder, and 50 percent by weight of a liquid neoprene composition sold by Roberts Consolidated Industries, Inc., under the designation EO810A, B Number 2815, and applying said mixture to a nondrying adhesive transfer tape sold by the Minnesota Manufacturing Company under the designation, Number 465. The resultant mixture is a liquid and is applied by a roller to the exposed adhesive side of said tape. The thickness of the resultant liquid layer is about 4½ mils and the thickness of said tape is about 2 mils. The tape with liquid layer applied thereto is heated in an infrared oven for about 6 minutes at about 310° F. to dry and cure said neoprene-molybdenum disulfide mixture so that the resultant lubricant adhesive film has sufficient elasticity to flow into pipe threads as previously described.

As described above, the solid lubricant adhesive film of the above Examples and the other solid lubricant adhesive films described herein can be readily employed on many types of threaded fittings, such as high-pressure fittings, vacuum fittings, hot water fittings, sprinkler head fittings, valve fittings, and the like. Preferably, before the solid lubricant adhesive film is applied to the threads of a fitting, the threads are cleaned free of dirt, rust, metal particles, oil, such as cutting oil, moisture, and the like.

I claim as my invention:

1. A solid lubricant adhesive film which comprises a film of a normally tacky, pressure-sensitive, adhesive composition selected from the class consisting of polymers of esters of acrylic acid, esters of a methylacrylic acid, esters of vinyl alcohol, ethers of vinyl alcohol, and copolymers of esters of acrylic acid and acylonitrile, methacrylonitrile, acrylic acid, and alphamethylacrylic acid, said film having an adhesive surface and a nonadhesive lubricant surface impregnated with a finely powdered solid lubricant selected from the group consisting of molybdenum disulfide, graphite, lead, tin, silver, polytetrafluoroethylene, and mixtures thereof.

2. The solid lubricant adhesive film as defined in claim 1 wherein said lubricant mixture comprises molybdenum disulfide and up to 50 percent by weight of neoprene.

3. A solid lubricant adhesive film comprising a non-drying film of a normally tacky, pressure-sensitive adhesive composition selected from the class consisting of polymers of esters of acrylic acid, esters of a methylacrylic acid, esters of vinyl alcohol, ethers of vinyl alcohol; and copolymers of esters of acrylic acid and acrylonitrile, acrylic acid, and alpha-methylacrylic acid having an adhesive surface and an opposing nonadhesive, lubricating surface impregnated with a solid lubricant; and a removable flexible release-type backing which carries the adhesive surface of the adhesive film, said solid lubricant mixture impregnated to a depth of between about 10 percent and about 80 percent of the adhesive film thickness, said solid lubricant mixture containing finely powdered solid lubricant having a particle size between about 10 microns and 100 microns, the finely powdered solid lubricant selected from the group consisting of molybdenum disulfide, graphite, lead, tin, silver polytetrafluoroethylene and mixtures thereof.

* * * * *